(12) United States Patent
Kidena et al.

(10) Patent No.: US 11,149,808 B2
(45) Date of Patent: Oct. 19, 2021

(54) EXCITATION OPERATION BRAKE

(71) Applicant: OGURA CLUTCH CO., LTD., Gunma (JP)

(72) Inventors: Yasuo Kidena, Aichi-ken (JP); Keita Nakashima, Aichi-ken (JP); Takeshi Maeda, Aichi-ken (JP); Motoi Kato, Gunma (JP); Yoshihiro Kurosu, Gunma (JP); Hiroyasu Onai, Gunma (JP); Kosuke Murakami, Gunma (JP)

(73) Assignee: OGURA CLUTCH CO., LTD., Gunma (JP)

( * ) Notice: Subject to any disclaimer, the term of this patent is extended or adjusted under 35 U.S.C. 154(b) by 125 days.

(21) Appl. No.: 16/591,434

(22) Filed: Oct. 2, 2019

(65) Prior Publication Data
US 2020/0112234 A1 Apr. 9, 2020

(30) Foreign Application Priority Data

Oct. 4, 2018 (JP) .............................. JP2018-188907

(51) Int. Cl.
| F16D 63/00 | (2006.01) |
| H02K 7/102 | (2006.01) |
| F16D 59/00 | (2006.01) |
| H02K 11/01 | (2016.01) |

(52) U.S. Cl.
CPC ............ *F16D 59/00* (2013.01); *F16D 63/002* (2013.01); *H02K 7/1023* (2013.01); *H02K 11/0141* (2020.08)

(58) Field of Classification Search
CPC ........ F16D 59/00; F16D 63/002; F16D 27/112; H02K 7/1023; H02K 11/0141
See application file for complete search history.

(56) References Cited

U.S. PATENT DOCUMENTS 4,498,066 A 2/1985 Fujiwara et al.

FOREIGN PATENT DOCUMENTS

| CN | 1900531 A | 1/2007 |
| EP | 1746266 A2 | 1/2007 |
| EP | 3633225 A1 | 4/2020 |
| IT | UB20156013 A1 | 5/2017 |
| JP | 60-179531 A | 9/1985 |

(Continued)

OTHER PUBLICATIONS

European Search Report and Search Opinion received for EP Patent Application No. 19200955.3, dated Mar. 6, 2020, 8 pages.

(Continued)

*Primary Examiner* — Burton S Mullins
(74) *Attorney, Agent, or Firm* — Womble Bond Dickinson (US) LLP (57) ABSTRACT

An excitation operation brake includes a braking shaft, an armature that rotates integrally with the braking shaft, and a field core including a disc portion facing the armature. The disc portion includes an outer magnetic shielding portion and an inner magnetic shielding portion, which make a magnetic flux flowing through the disc portion bypass to the armature a plurality of times. The outer magnetic shielding portion includes a low-magnetic resistance path having a magnetic resistance smaller than the magnetic resistance of a magnetic path that bypasses to the armature.

6 Claims, 11 Drawing Sheets

(56) References Cited

FOREIGN PATENT DOCUMENTS

JP      2008-309265 A    12/2008
JP       2012122515   *   6/2012   ............ F16D 27/118

OTHER PUBLICATIONS

Office Action received for Chinese Patent Application No. 201910908041.3, dated Jan. 5, 2021, 8 pages (3 pages of English Translation and 5 pages of Office Action).
Office Action received for European Patent Application No. 19200955.3, dated Jan. 28, 2021, 2 pages.
Office Action received for European Patent Application No. 19200955.3, dated Oct. 1, 2020, 6 pages.

* cited by examiner

EXCITATION OPERATION BRAKE

BACKGROUND OF THE INVENTION

The present invention relates to an excitation operation brake that brakes a rotation member or a moving member or holds a braking state thereof.

An excitation operation brake (to be simply referred to as an electromagnetic brake hereinafter) constitutes a braking device and a braking holding device, and is used as a safety device in various fields. In the electromagnetic brake of this type, a field core including an exciting coil is fixed to a support body so as not to be movable, and an armature is provided on a braking shaft as the target of braking in many cases. In this electromagnetic brake, the exciting coil is energized, and the armature is magnetically attracted to the field core, thereby braking the rotation of the braking shaft.

Figure 11:
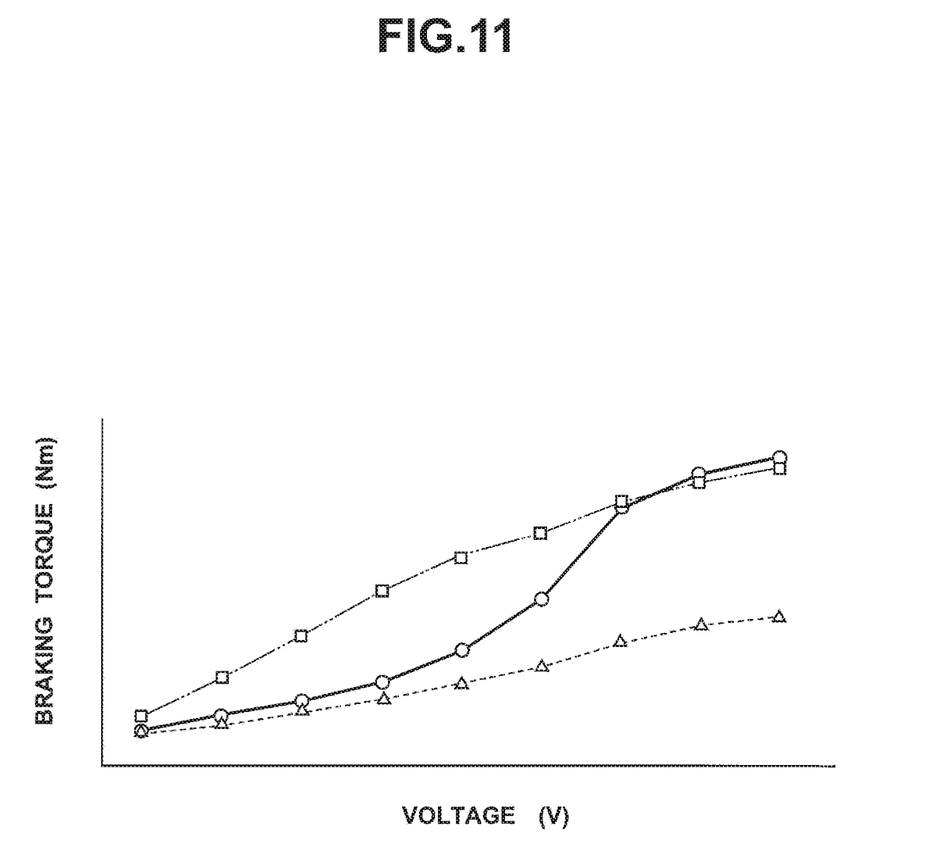
FIG. 11 is a graph showing the relationship between a voltage and the braking torque of the excitation operation brake.

A friction torque T generated in the electromagnetic brake of this type can be obtained by a formula "friction coefficient μ×total pressure P in axial direction×effective radius R of friction surface×number N of friction surfaces". The torque value is a value complying with the B (magnetic flux density)-H (magnetic field strength) characteristic of an iron core. For this reason, the braking torque of the electromagnetic brake becomes large along with an increase in a voltage applied to the exciting coil, as shown in FIG. 11. In FIG. 11, a broken line represents the operation characteristic of an electromagnetic brake (to be simply referred to as a low torque electromagnetic brake hereinafter) formed to have a relatively low braking torque. An alternate long and two short dashed line represents the operation characteristic of an electromagnetic brake (to be simply referred to as a high torque electromagnetic brake hereinafter) formed to have a relatively high braking torque.

The low torque electromagnetic brake is a so-called single flux electromagnetic brake. Single flux means a magnetic circuit in which the magnetic flux of an exciting coil bypasses once from a field core to an armature side. The high torque electromagnetic brake is a so-called double flux electromagnetic brake. Double flux means a magnetic circuit in which the magnetic flux of an exciting coil bypasses twice from a field core to an armature side. The high torque electromagnetic brake can make the magnetic attraction force larger than that of the low torque electromagnetic brake, and can therefore obtain a high braking torque. In addition, as is apparent from FIG. 11, the minimum braking torque of the high torque electromagnetic brake is larger than the minimum braking torque of the low torque electromagnetic brake.

Some electromagnetic brakes are required to have performance capable of rotating the braking shaft in a state in which the minimum braking torque is generated, and when stopping the braking shaft, completely stopping the braking shaft with a large maximum braking torque. To meet this requirement, the high torque electromagnetic brake needs to be used to obtain the large maximum braking torque. However, the associated high torque electromagnetic brake cannot meet the above-described requirement because the minimum braking torque is larger than that of the low torque electromagnetic brake, and therefore, the braking shaft is difficult to rotate in a state in which the minimum braking torque is generated.

SUMMARY OF THE INVENTION

It is an object of the present invention to provide an excitation operation brake capable of obtaining a minimum braking torque approximate to the minimum braking torque of a low torque electromagnetic brake and obtaining a maximum braking torque approximate to the maximum braking torque of a high torque electromagnetic brake.

In order to achieve the above object of the present invention, there is provided an excitation operation brake (1) comprising a braking shaft (2) serving as a braking target member, an armature (9) attached to the braking shaft (2) such that the armature (9) rotates integrally with the braking shaft (2), a field core (31) including a disc (21) facing the armature (9) in an axial direction of the braking shaft (2), and an annular groove (41), and an exciting coil (42) stored in the annular groove (41) of the field core (31), wherein the disc (21) forms a magnetic flux path that makes a magnetic flux generated by energizing the exciting coil (42) flow in a radial direction of the disc (21), the disc (21) includes a plurality of magnetic shielding portions (47, 48) that make the magnetic flux bypass to the armature (9) a plurality of times, and of the plurality of magnetic shielding portions (47, 48), an outer magnetic shielding portion (47) located on an outer side in the radial direction includes a low-magnetic resistance path (71) having a magnetic resistance smaller than a magnetic resistance of a magnetic path that bypasses to the armature (9).

DESCRIPTION OF THE PREFERRED EMBODIMENT

An excitation operation brake according to an embodiment of the present invention will now be described in detail with reference to FIGS. 1 to 9.

Figure 1:
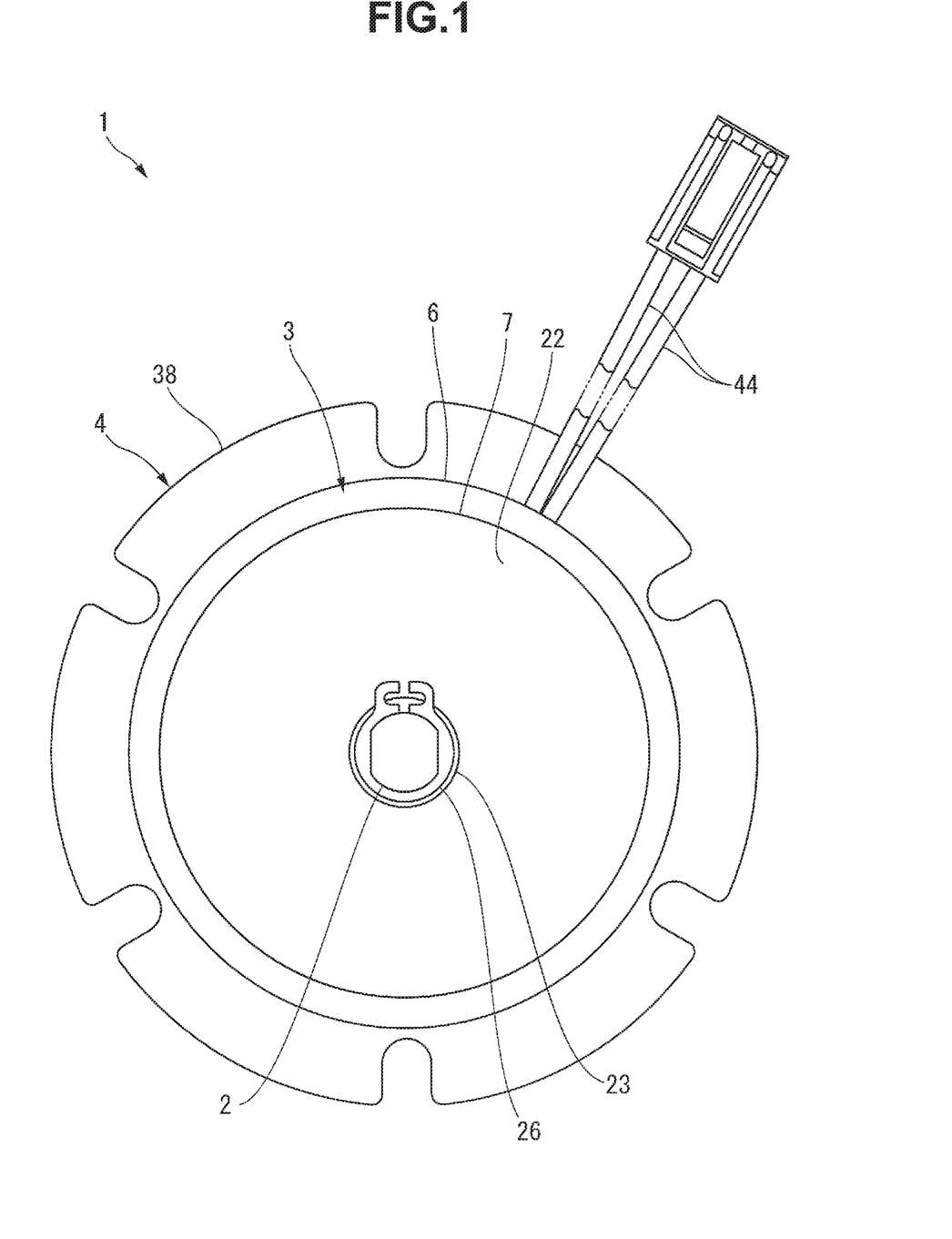
FIG. 1 is a front view of an excitation operation brake according to an embodiment of the present invention.
Figure 2:
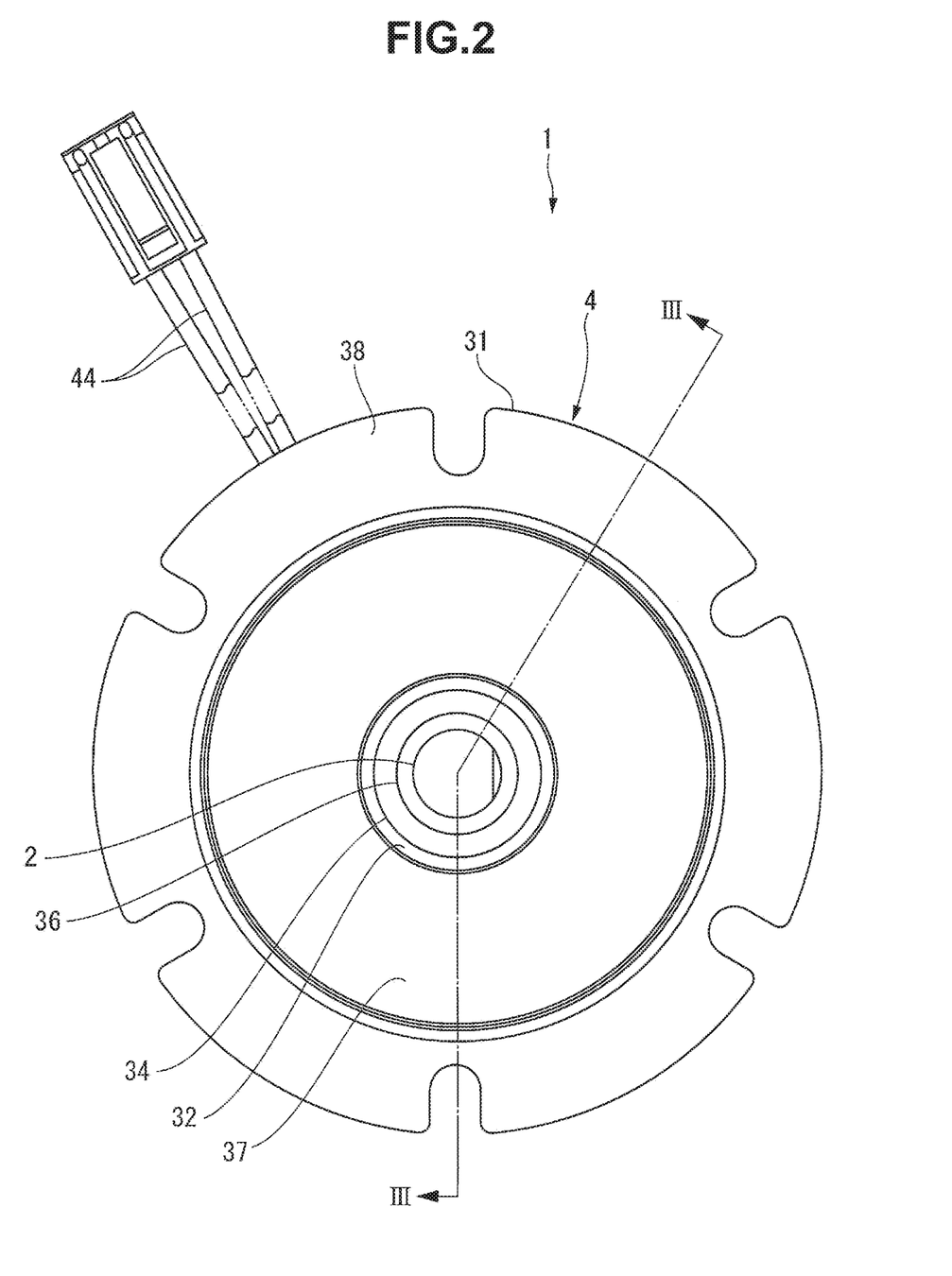
FIG. 2 is a rear view of the excitation operation brake shown in FIG. 1.

An excitation operation brake (to be simply referred to as an electromagnetic brake hereinafter) 1 shown in FIG. 1 is a no-gap double flux electromagnetic brake that brakes the rotation of a braking shaft 2 located at the center in FIG. 1. The electromagnetic brake 1 includes the braking shaft 2, an armature assembly 3 provided on one end side (the near side in FIG. 1 or the right side in FIG. 3) of the braking shaft 2, a field core assembly 4 alongside the armature assembly 3, and the like. A direction will be mentioned in the description of the arrangement of the electromagnetic brake 1 by defining one side portion where the armature assembly 3 is located as a front side for a descriptive convenience.

Figure 3:
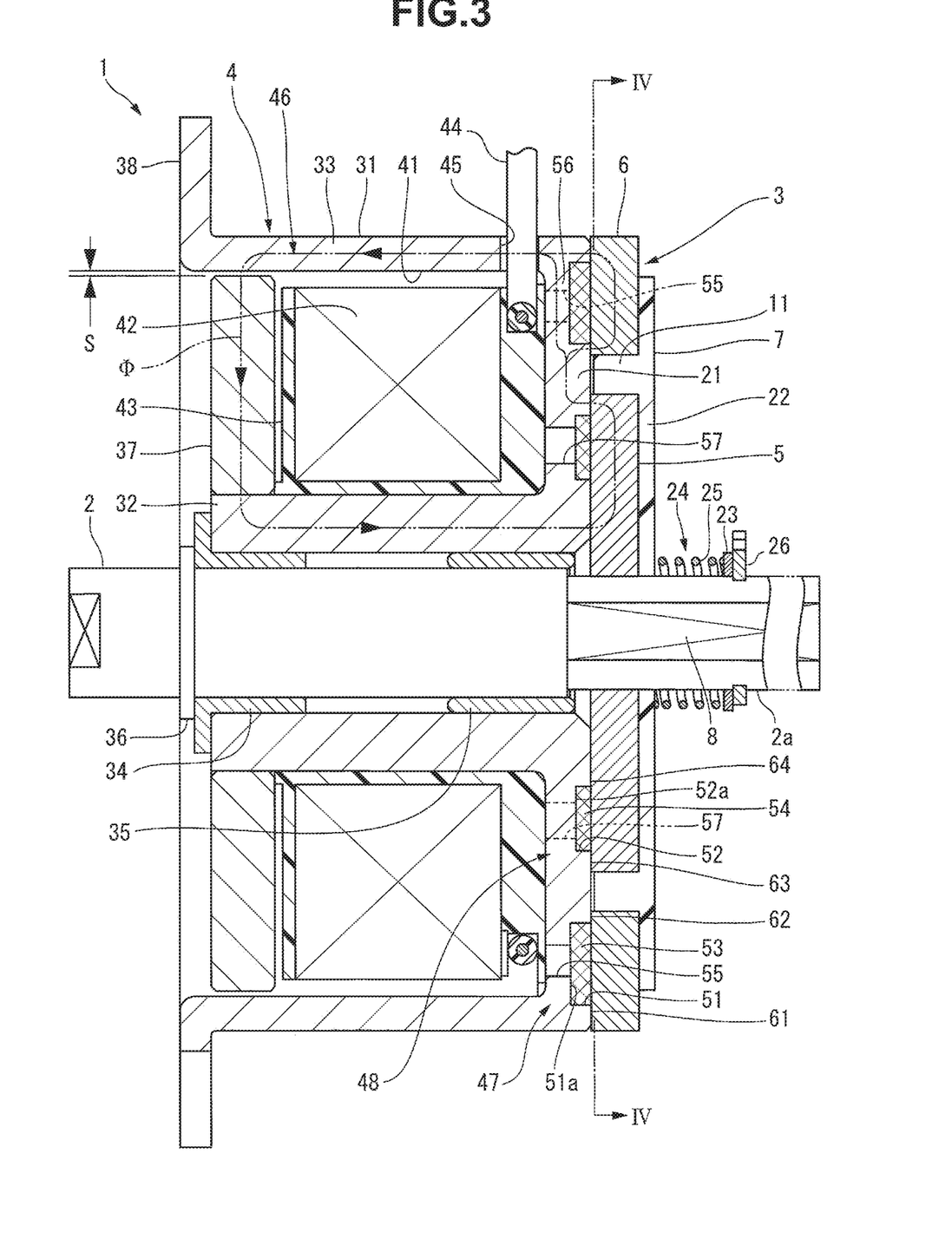
FIG. 3 is a sectional view taken along a line III-III in FIG. 2.
Figure 4:
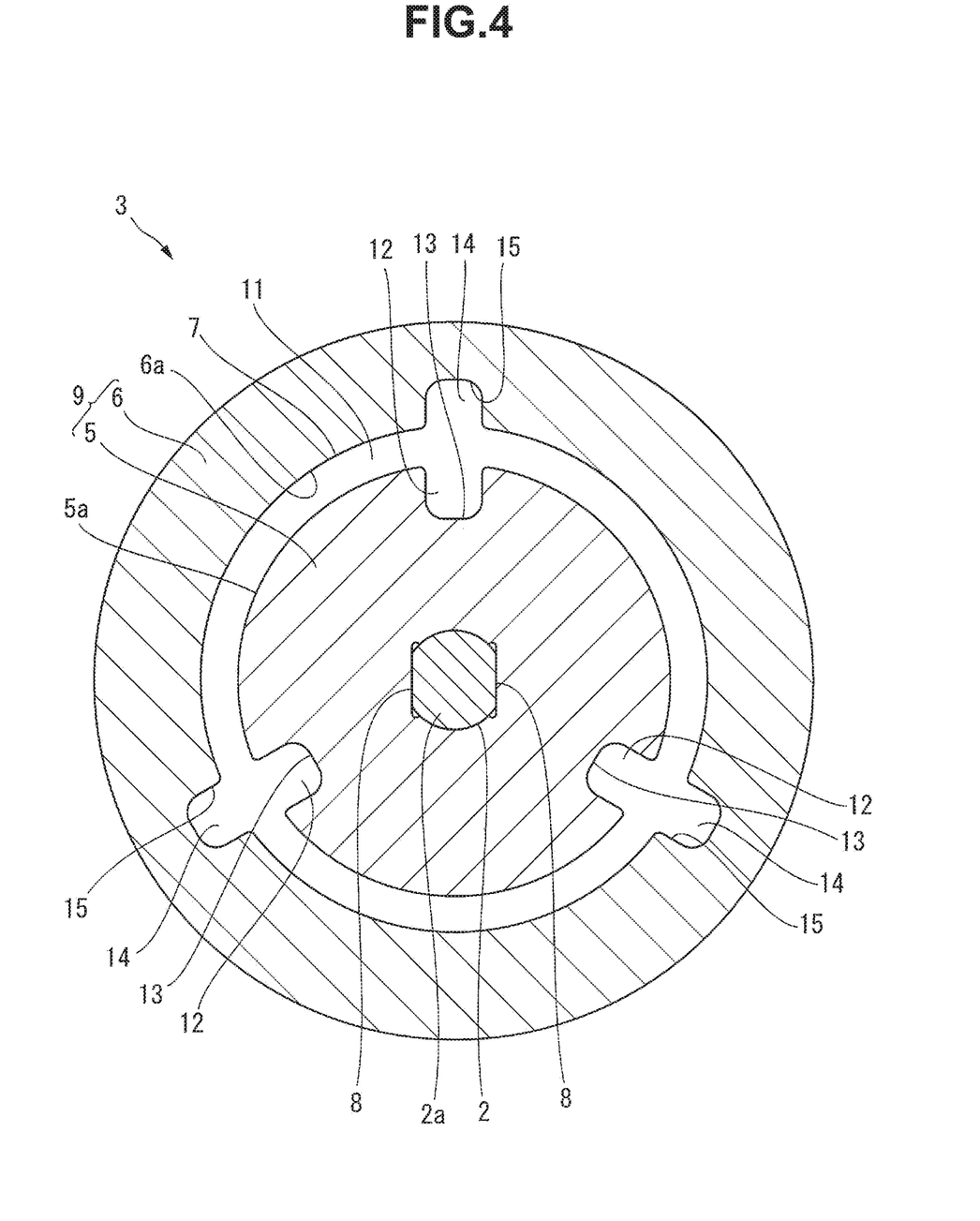
FIG. 4 is a sectional view showing the armature assembly of the excitation operation brake cut at a position indicated by a line IV-IV in FIG. 3.

The braking shaft 2 is a braking target member. As shown in FIGS. 3 and 4, the braking shaft 2 includes a connecting portion 2a including a pair of cut faces 8.

A snap ring 26 engages with the front end portion of the braking shaft 2. A spring seat 23 is overlaid on the snap ring 26 from the rear side. The spring seat 23 is formed by a ring through which the braking shaft 2 extends. A spring member 24 is provided between the spring seat 23 and the armature assembly 3. The spring member 24 biases the armature assembly 3 toward a disc portion 21 of a field core to be described later. The spring member 24 according to this embodiment is formed by a compression coil spring 25.

The armature assembly 3 is formed into a disc shape. The armature assembly 3 includes an inner armature 5 located on the inner side in the radial direction, an outer armature 6 located on the outer side in the radial direction, and a coupling 7 located between the inner armature 5 and the outer armature 6.

The inner armature 5 and the outer armature 6 are made of a magnetic material. The coupling 7 is made of a non-magnetic material. The inner armature 5 and the outer armature 6 are formed into final shapes and then undergo a hardening treatment. The coupling 7 is made of a fiber reinforced plastic. Note that the material of the coupling 7 may be a metal material or another plastic material or rubber material as long as it has a necessary strength.

The axis portion of the inner armature 5 is fitted on the connecting portion 2a of the braking shaft 2, as shown in FIG. 4, to be movable in the axial direction of the braking shaft 2. The outer peripheral portion of the inner armature 5 includes an outer peripheral surface 5a fitted in an annular wall 11 of the coupling 7, and a plurality of engaging grooves 13 engaging with a plurality of inner engaging projections 12 of the coupling 7, and is supported by the coupling 7 to be movable in the axial direction of the braking shaft 2.

The outer armature 6 is formed into an annular plate shape. The inner peripheral portion of the outer armature 6 includes an inner peripheral surface 6a fitted on the annular wall 11 of the coupling 7, and a plurality of engaging grooves 15 engaging with a plurality of outer engaging projections 14 of the coupling 7, and is supported by the coupling 7 to be movable in the axial direction of the braking shaft 2. The outer diameter of the outer armature 6 almost equals the outer diameter of the disc portion (disc) 21 (see FIG. 3) that constitutes the front end of the field core assembly 4 to be described later.

The inner armature 5 and the outer armature 6 form an armature 9. The armature 9 is attached to the braking shaft 2 such that it rotates integrally with the braking shaft 2.

As shown in FIG. 3, the coupling 7 includes a disc-shaped main body portion 22 through which the connecting portion 2a of the braking shaft 2 extends, and the annular wall 11, the inner engaging projections 12, and the outer engaging projections 14, which project backward from the main body portion 22.

The main body portion 22 is supported to be movable in the axial direction in a state in which it is fitted on the connecting portion 2a of the braking shaft 2. In addition, the main body portion 22 is biased backward with respect to the braking shaft 2 by the spring member 24 provided between the spring seat 23 and the main body portion 22.

As shown in FIG. 4, the annular wall 11 of the coupling 7 is formed into an annular shape with respect to the braking shaft 2 as the center. The inner engaging projections 12 and the outer engaging projections 14 are provided at positions that divide the annular wall 11 into three equal parts in the circumferential direction. The inner engaging projections 12 project from the annular wall 11 to the inner side in the radial direction. The outer engaging projections 14 project from the annular wall 11 to the outer side in the radial direction. The inner engaging projections 12 and the outer engaging projections 14 are formed at the same positions in the circumferential direction of the annular wall 11.

The height (the amount of projection from the main body portion 22) of the annular wall 11 is the same as the height of the inner engaging projections 12 and the outer engaging projections 14. In addition, the rear end of the annular wall 11 and the rear ends of the inner engaging projections 12 and the outer engaging projections 14 are located on the front side of the rear ends of the inner armature 5 and the outer armature 6 attached to the coupling 7, as shown in FIG. 3.

As described above, since the main body portion 22 of the coupling 7 is fitted on the connecting portion 2a of the braking shaft 2, the coupling 7 rotates integrally with the braking shaft 2.

Additionally, the coupling 7 supports the outer armature 6 and the inner armature 5, and therefore functions as a disc-shaped support member.

The field core assembly 4 is formed by assembling various kinds of parts to the field core 31 located on the outermost side in FIG. 3. As shown in FIGS. 3 and 5 to 7, the field core 31 includes a cylindrical inner cylindrical portion 32 located on the inner side in the radial direction, a cylindrical outer cylindrical portion 33 positioned on the same axis as the inner cylindrical portion 32 and located on the outer side of the inner cylindrical portion 32 in the radial direction, and the annular disc portion 21 configured to connect the front end of the inner cylindrical portion 32 and the front end of the outer cylindrical portion 33. The disc portion 21 faces the armature 9 including the inner armature 5 and the outer armature 6 in the axial direction of the braking shaft 2.

As shown in FIG. 3, first and second sliding bearings 34 and 35 are provided on the inner peripheral portion of the inner cylindrical portion 32. The inner cylindrical portion 32 supports the braking shaft 2 via the first and second sliding bearings 34 and 35 such that the braking shaft 2 can rotate and move in the axial direction. The first and second sliding bearings 34 and 35 are made of a non-magnetic material to prevent a magnetic flux Φ passing through the field core 31 from leaking to the braking shaft 2. Of the first and second sliding bearings 34 and 35, the first sliding bearing 34 located on the rear side is in contact with a retaining ring 36 attached to the braking shaft 2, thereby regulating the movement of the braking shaft 2 to the front side.

An annular core plate 37 is fixed, in a fitted state, to the outer peripheral surface of the inner cylindrical portion 32. A gap S for magnetic shielding is formed between the outer peripheral surface of the core plate 37 and the inner peripheral surface of the outer cylindrical portion 33.

The outer cylindrical portion 33 projects backward with respect to the inner cylindrical portion 32. An attachment flange 38 extending to the outer side in the radial direction is integrally formed at the rear end of the outer cylindrical portion 33.

The disc portion 21 is a portion in contact with the above-described armature assembly 3. The outer armature 6 and the inner armature 5 of the armature assembly 3 are pressed against the front surface of the disc portion 21 by the spring force of the spring member 24. The disc portion 21 forms an annular groove 41 together with the inner cylindrical portion 32 and the outer cylindrical portion 33. An exciting coil 42 is stored in the annular groove 41 together with a bobbin 43.

The exciting coil 42 is connected to a power supply device (not shown) via a feeding cable 44. Upon receiving power fed from the power supply device, the exciting coil 42 is excited to generate the magnetic flux Φ. The feeding cable 44 is passed through a through hole 45 of the outer cylindrical portion 33 and led out to the outside of the field core 31. When the exciting coil 42 is energized, the magnetic flux Φ is generated as indicated by the alternate long and two short dashed line in FIG. 3. The magnetic flux Φ passes through a closed magnetic flux path 46 formed by the inner cylindrical portion 32, the disc portion 21, the outer cylindrical portion 33, the core plate 37, and the like. Note that the disc portion 21 forms a magnetic flux path that makes the magnetic flux Φ flow in the radial direction.

The disc portion 21 of the field core 31 includes a plurality of magnetic shielding portions 47 and 48 that make it difficult to pass the magnetic flux Φ such that the magnetic flux Φ generated by energizing the exciting coil 42 bypasses to the armature 9 a plurality of times. The plurality of magnetic shielding portions 47 and 48 according to this embodiment are formed by the outer magnetic shielding portion 47 located on the outer side in the radial direction of the disc portion 21, and the inner magnetic shielding portion 48 located on the inner side in the radial direction with respect to the outer magnetic shielding portion 47. The outer magnetic shielding portion 47 and the inner magnetic shielding portion 48 are arranged concentrically with respect to the axis of the braking shaft 2. The outer magnetic shielding portion 47 is provided at a position facing the outer armature 6 to make the magnetic flux Φ bypass to the outer armature 6. The inner magnetic shielding portion 48 is provided at a position facing the inner armature 5 to make the magnetic flux Φ bypass to the inner armature 5.

Figure 5:
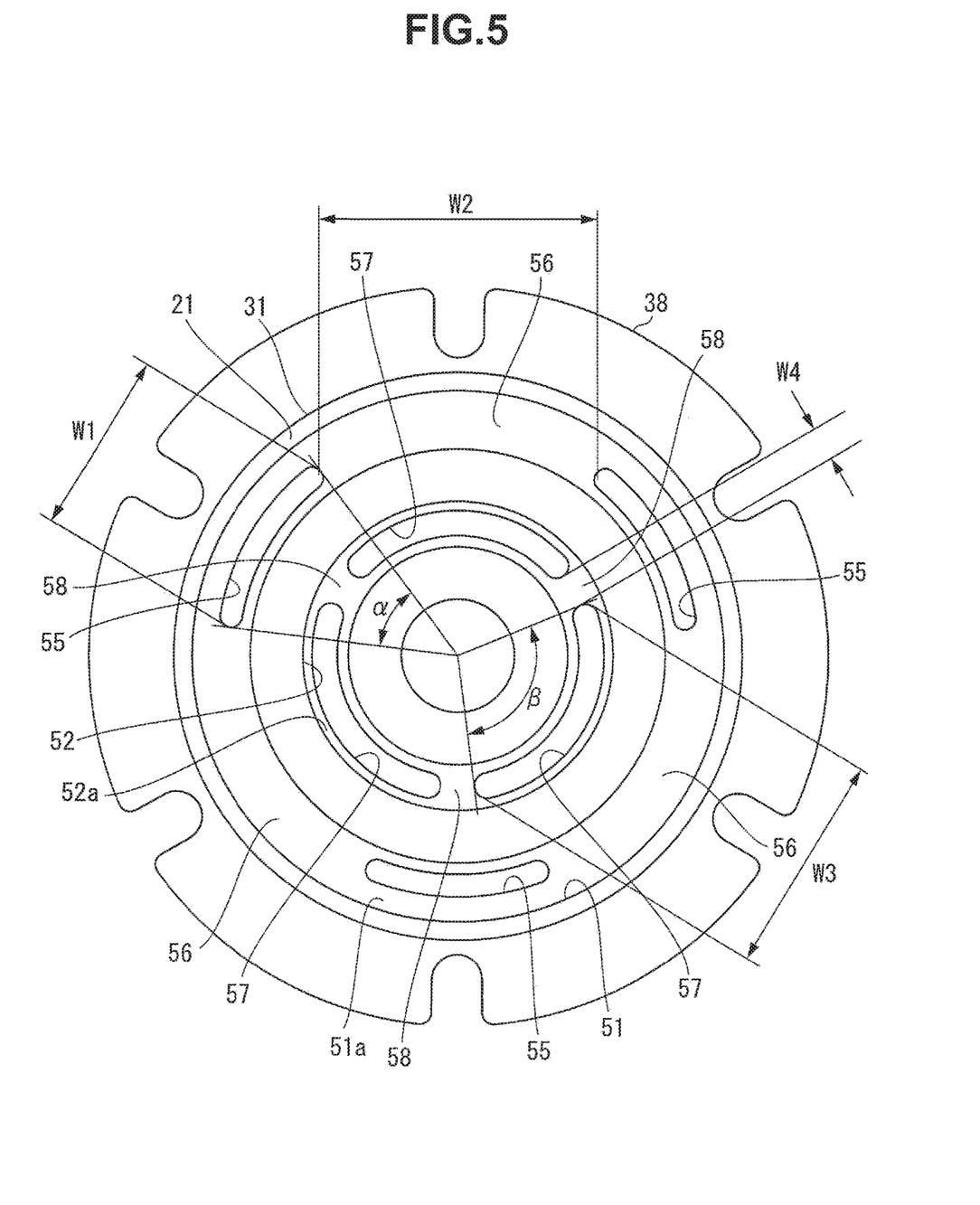
FIG. 5 is a front view of the field core of the excitation operation brake.
Figure 6:
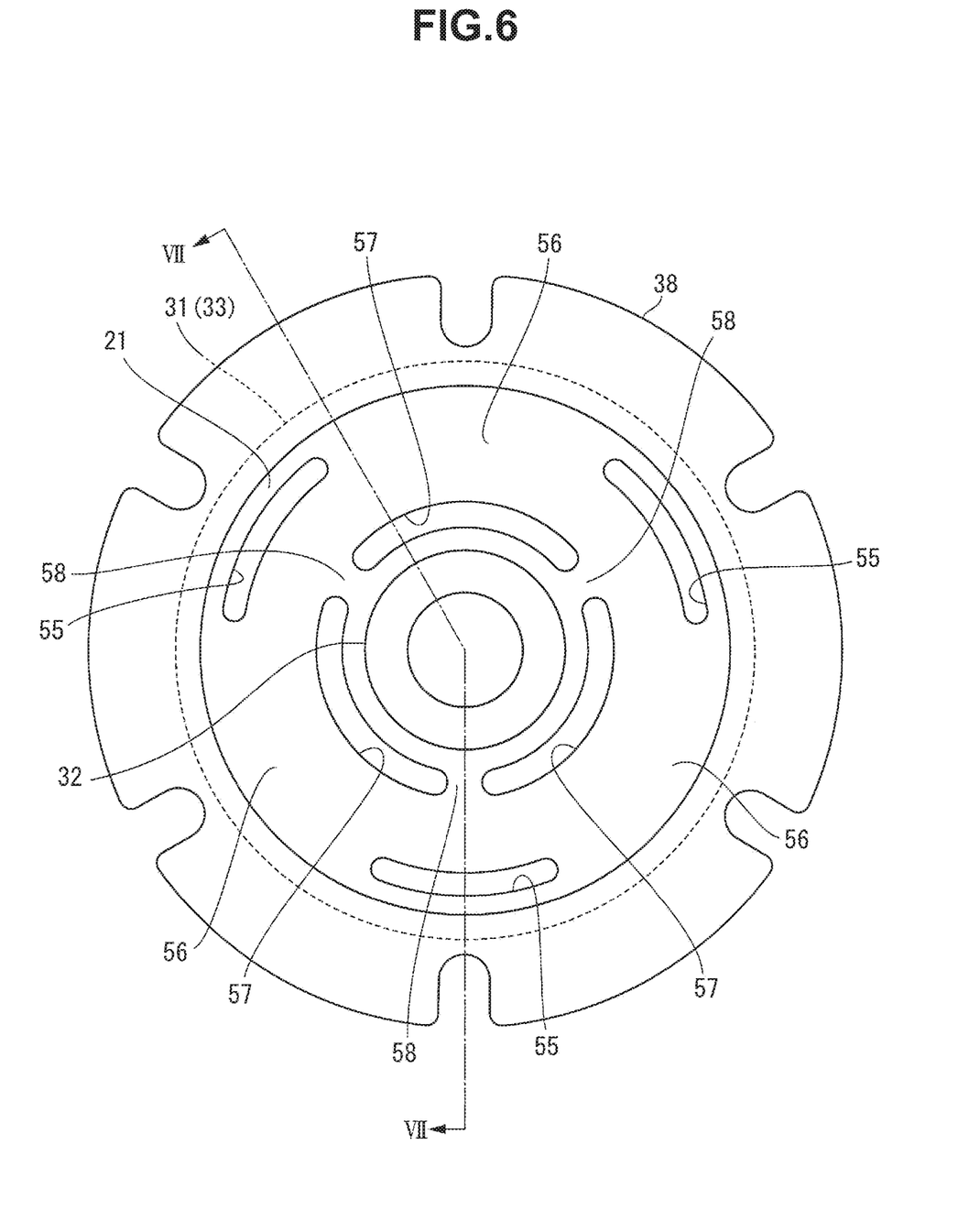
FIG. 6 is a rear view of the field core shown in FIG. 5.
Figure 7:
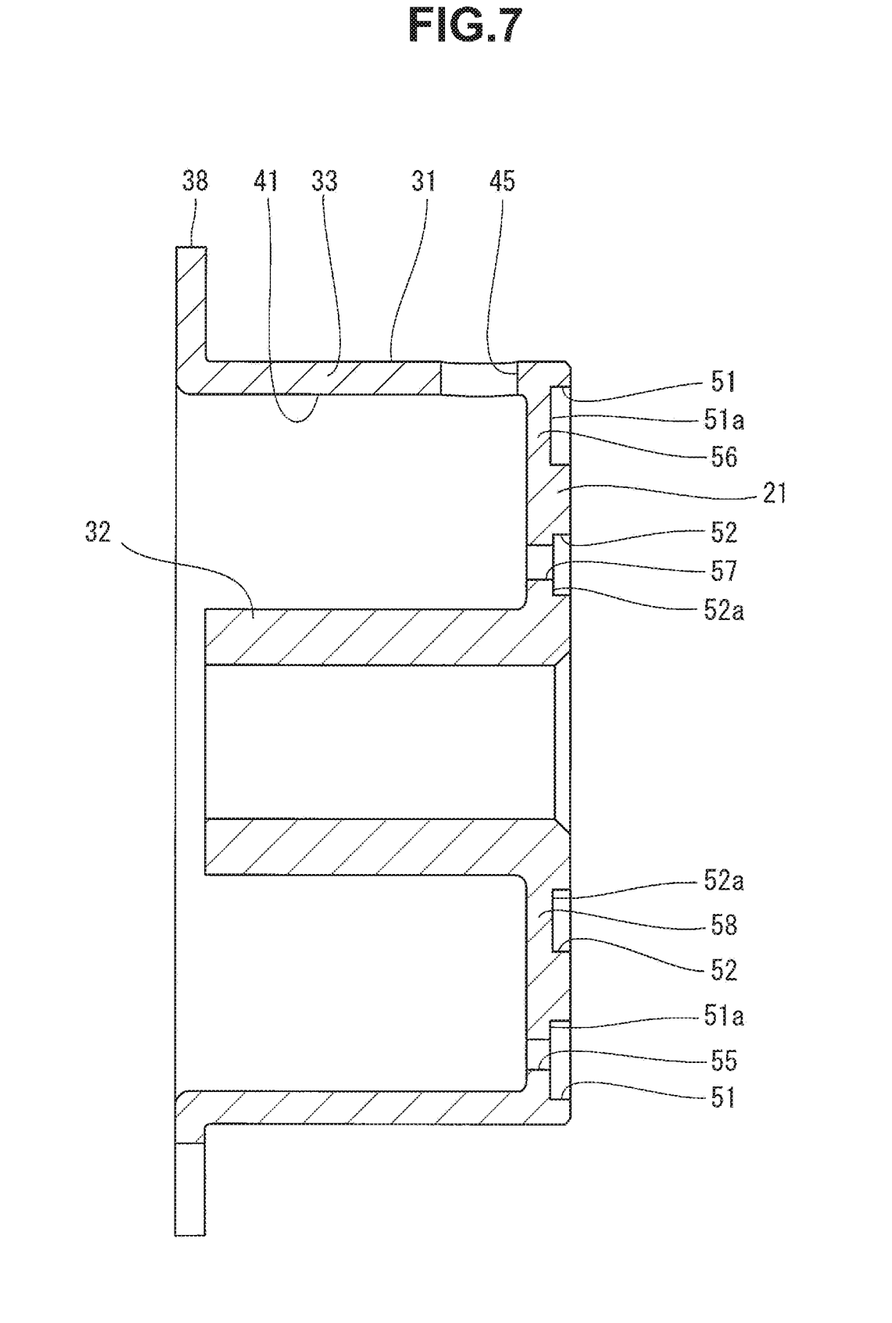
FIG. 7 is a sectional view taken along a line VII-VII in FIG. 6.

The outer magnetic shielding portion 47 includes an outer groove 51 opening to the front surface of the disc portion 21. The inner magnetic shielding portion 48 includes an inner groove 52 opening to the front surface of the disc portion 21. As shown in FIG. 5, each of the outer groove 51 and the inner groove 52 is formed into an annular shape when viewed from the front side. The groove width (the width in the radial direction of the disc portion 21) of the outer groove 51 according to this embodiment is larger than the groove width of the inner groove 52. As shown in FIG. 3, an outer friction plate 53 is provided in the outer groove 51. An inner friction plate 54 is provided in the inner groove 52.

A plurality of outer slits 55 are formed in a groove bottom 51a (see FIG. 5) of the outer groove 51. In this embodiment, three outer slits 55 are formed in the outer groove 51. The opening shape of the outer slits 55 is an arcuated long circle shape with respect to the axis of the braking shaft 2 as the center. The three outer slits 55 are formed at a first interval (W2) at positions that divide the disc portion 21 into three equal parts in the circumferential direction, and extend through the groove bottom 51a in the front-and-rear direction. Each outer slit 55 is formed such that the angle from one end to the other end in the circumferential direction of the disc portion 21 becomes an angle α. That is, the central angle of the outer slit 55 is α.

When the three outer slits 55 are formed in the outer groove 51, outer bridge portions 56 are formed between the outer slits 55 on the groove bottom 51a of the outer groove 51. The outer bridge portions 56 are regions between the outer slits 55 adjacent in the circumferential direction. A forming width W1 of the outer slits 55 in the circumferential direction of the disc portion 21 is smaller than the forming width W2 of the outer bridge portions 56.

A plurality of inner slits 57 are formed in a groove bottom 52a of the inner groove 52. In this embodiment, three inner slits 57 are formed. The opening shape of the inner slits 57 is an arcuated long circle shape with respect to the axis of the braking shaft 2 as the center. The three inner slits 57 are formed at a second interval (W4) at positions that divide the disc portion 21 into three equal parts in the circumferential direction, and extend through the groove bottom 52a in the front-and-rear direction. Each inner slit 57 is formed such that the angle from one end to the other end in the circumferential direction of the disc portion 21 becomes an angle β. That is, the central angle of the inner slit 57 is β.

When the three inner slits 57 are formed in the inner groove 52, inner bridge portions 58 are formed between the inner slits 57 on the groove bottom 52a of the inner groove 52. The inner bridge portions 58 are regions between the inner slits 57 adjacent in the circumferential direction. A forming width W3 of the inner slits 57 in the circumferential direction of the disc portion 21 is larger than the forming width W4 of the inner bridge portions 58.

The angle α from one end to the other end of the outer slit 55 in the circumferential direction of the disc portion 21 is smaller than the angle β from one end to the other end of the inner slit 57 in the circumferential direction of the disc portion 21. The forming width W2 of the outer bridge portion 56 is larger than the forming width W4 of the inner bridge portion 58. The width of the inner slits 57 in the radial direction is larger than the width of the outer slits 55 in the radial direction.

When the outer groove 51 and the inner groove 52 are thus formed in the disc portion 21, first and second magnetic pole faces 61 and 62 facing the outer armature 6 and third and fourth magnetic pole faces 63 and 64 facing the inner armature 5 are formed on the disc portion 21. The first magnetic pole face 61 is formed between the outer groove 51 and the outer peripheral edge of the disc portion 21. The second magnetic pole face 62 is formed between the outer groove 51 and the inner groove 52 in a part facing the outer armature 6 on the outer side in the radial direction. The third magnetic pole face 63 is formed between the outer groove 51 and the inner groove 52 in a part facing the inner armature 5 on the inner side in the radial direction. The fourth magnetic pole face 64 is formed between the inner groove 52 and the inner peripheral edge of the disc portion 21.

In the thus configured electromagnetic brake 1, the magnetic flux Φ is generated in the field core 31, and the inner armature 5 or the outer armature 6 is magnetically attracted by the disc portion 21, thereby braking the rotation of the braking shaft 2. A braking torque generated at the time of braking changes in accordance with the magnitude of a current (voltage) supplied to the exciting coil 42.

Figure 8:
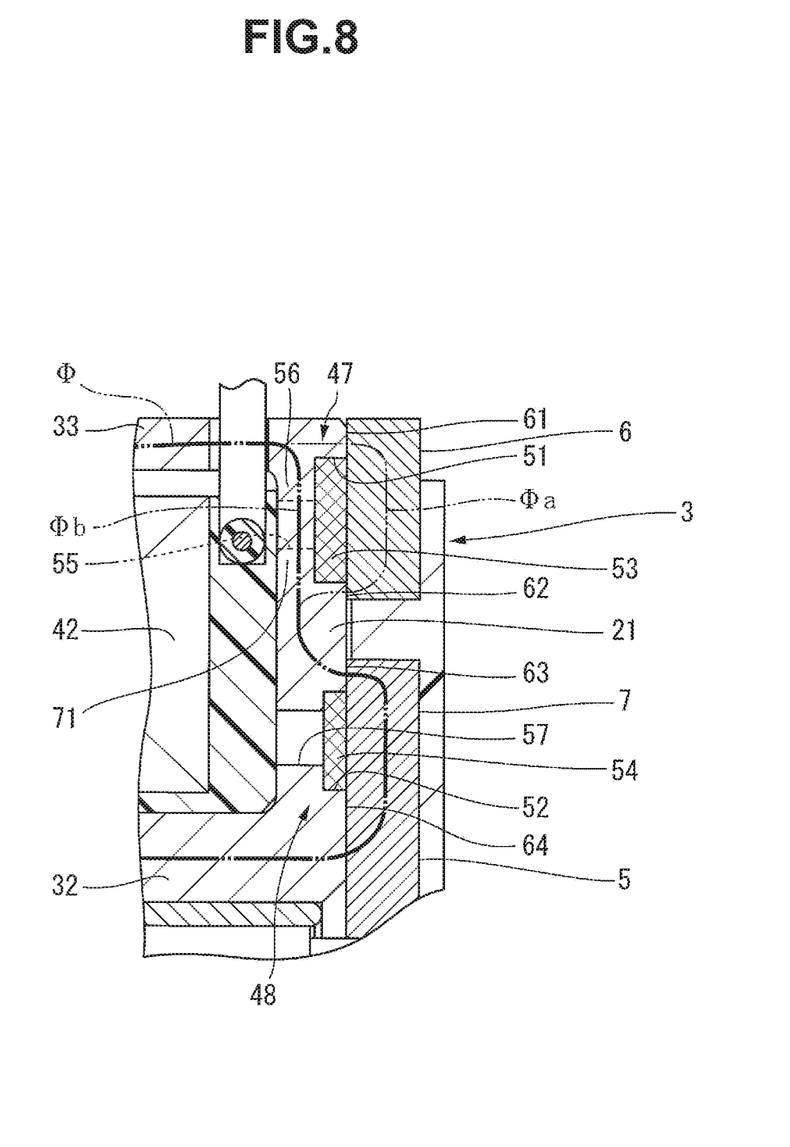
FIG. 8 is a sectional view of main parts showing the state of a magnetic flux when a low current is supplied.

When a low current is supplied to the exciting coil 42, as shown in FIG. 8, on the inner side in the radial direction of the disc portion 21 of the field core 31, the magnetic flux Φ passes through the third and fourth magnetic pole faces 63 and 64 and bypasses to the inner armature 5 while avoiding the inner magnetic shielding portion 48 of the disc portion 21.

In this case, on the outer side in the radial direction of the disc portion 21, the magnetic flux amount becomes relatively small. Hence, on the outer side in the radial direction of the disc portion 21, a magnetic flux Φa passing through a magnetic path with a relatively large magnetic resistance becomes relatively small, and a magnetic flux Φb passing through a magnetic path with a relatively small magnetic resistance becomes relatively large. The magnetic path with a relatively large magnetic resistance is a magnetic path that crosses the outer slits 55 or a magnetic path that bypasses from the first and second magnetic pole faces 61 and 62 to the outer armature 6. The magnetic path with a relatively small magnetic resistance is a magnetic path that crosses the outer bridge portions 56. That is, the magnetic resistance of the magnetic path passing through the outer bridge portions 56 is smaller than the magnetic resistance of the magnetic path that crosses the outer slits 55 and the magnetic path that bypasses to the outer armature 6. Hence, the magnetic flux Φa that is a part of the magnetic flux Φ flowing from the inner armature 5 to the disc portion 21 bypasses to the outer armature 6, but most of the magnetic flux Φb separately flows to the outer bridge portions 56. The outer bridge portions 56 form a low-magnetic resistance path 71, and the magnetic flux Φb passes through the outer bridge portions 56 in the radial direction of the disc portion 21.

For this reason, if a low current is supplied to the exciting coil 42, the inner armature 5 is attracted by the disc portion 21 by the magnetic attraction force of the magnetic flux Φ bypassed to the inner armature 5 on the inner side in the radial direction of the disc portion 21, thereby generating a braking torque and braking the braking shaft 2. In this case, since the electromagnetic brake 1 substantially functions as a single flux electromagnetic brake, a minimum braking torque similar to that of a low torque electromagnetic brake can be obtained.

Figure 9:
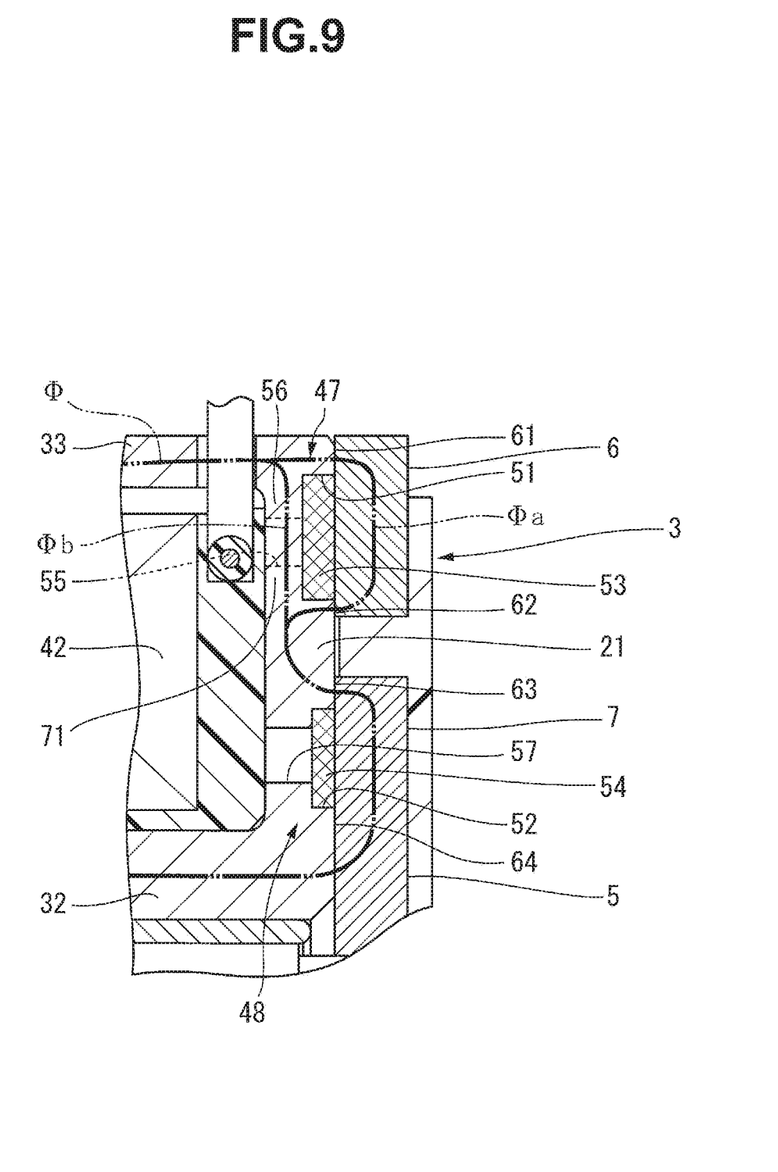
FIG. 9 is a sectional view of main parts showing the state of a magnetic flux when a high current is supplied.

If a high current is supplied to the exciting coil 42, as shown in FIG. 9, on the outer side in the radial direction of the disc portion 21, the magnetic flux that bypasses to the outer armature 6 while avoiding the outer magnetic shielding portion 47, in other words, the magnetic flux Φa that bypasses to the outer armature 6 via the first and second magnetic pole faces 61 and 62 increases. For this reason, the outer armature 6 is also attracted by the disc portion 21 by the magnetic attraction force, and the braking force that brakes the braking shaft 2 increases. In this case, since the braking force is generated using both the inner armature 5 and the outer armature 6, and the electromagnetic brake 1 substantially functions as a double flux electromagnetic brake, a maximum braking torque similar to that of a high torque electromagnetic brake can be obtained.

The braking torque of the electromagnetic brake 1 changes, as indicated by a solid line in FIG. 11, in accordance with a change in the voltage applied to the exciting coil 42. As shown in FIG. 11, in the electromagnetic brake 1 according to this embodiment, when the current (voltage) value is low, a braking torque approximate to the minimum value of the braking torque of the low torque electromagnetic brake can be obtained, and when the current (voltage) value becomes high, a braking torque approximate to the maximum value of the braking torque of the high torque electromagnetic brake can be obtained. Additionally, it is found that when the arrangement of this embodiment is employed, an operation characteristic representing that the increase ratio of the braking torque becomes high as compared to the low torque electromagnetic brake and the high torque electromagnetic brake can be obtained in the process of changing the voltage from a low state to a high state. Note that numerical values in design such as the number of windings of the exciting coil 42 in the electromagnetic brake 1 are different from numerical values in the high torque electromagnetic brake.

The plurality of magnetic shielding portions according to this embodiment include the outer magnetic shielding portion 47 located on the outer side in the radial direction of the disc portion 21, and the inner magnetic shielding portion 48 located on the inner side in the radial direction of the disc portion 21. The outer magnetic shielding portion 47 includes the plurality of outer slits 55 formed at the first interval (W2) in the circumferential direction of the disc portion 21, and the outer bridge portions 56 that are regions between the outer slits 55 adjacent in the circumferential direction. The inner magnetic shielding portion 48 includes the plurality of inner slits 57 formed at the second interval (W4) in the circumferential direction of the disc portion 21, and the inner bridge portions 58 that are regions between the inner slits 57 adjacent in the circumferential direction. The forming width W1 of the outer slits 55 in the circumferential direction of the disc portion 21 is smaller than the forming width W2 of the outer bridge portions 56. The forming width W3 of the inner slits 57 in the circumferential direction of the disc portion 21 is larger than the forming width W4 of the inner bridge portions 58. The outer bridge portions 56 form the low-magnetic resistance path 71.

According to this embodiment, the magnetic shielding rate of the inner magnetic shielding portion 48 is high, and the magnetic shielding rate of the outer magnetic shielding portion 47 is low. For this reason, a portion where the magnetic attraction force of the armature 9 acts is limited to the inner side in the radial direction (inner armature 5). It is therefore possible to reduce the effective radius of the friction surface and reliably make the braking torque small at the time of low current supply.

In this embodiment, the angle α from one end to the other end of the outer slit 55 in the circumferential direction of the disc portion 21 is smaller than the angle β from one end to the other end of the inner slit 57 in the circumferential direction of the disc portion 21. For this reason, the magnetic shielding rate of the outer magnetic shielding portion 47 is lower than the magnetic shielding rate of the inner magnetic shielding portion 48. It is therefore possible to further reduce the magnetic flux Φa that bypasses to the outer side (outer armature 6) in the radial direction of the armature 9 at the time of low current supply and make the minimum braking torque smaller.

The armature 9 according to this embodiment includes the outer armature 6 facing the outer magnetic shielding portion 47, and the inner armature 5 facing the inner magnetic shielding portion 48. The outer armature 6 and the inner armature 5 are supported by the disc-shaped coupling 7 that rotates integrally with the braking shaft 2. The outer armature 6, the inner armature 5, and the coupling 7 form the armature assembly 3. The armature assembly 3 is biased toward the disc portion 21 of the field core 31 by the spring member 24.

According to this embodiment, it is possible to form a no-gap electromagnetic brake in which an air gap is not formed between the friction surface (the front surface of the disc portion 21) of the field core 31 and the friction surfaces (rear surfaces) of the inner and outer armatures 5 and 6. For this reason, it is possible to provide an excitation operation brake that is excellent in the braking torque rise characteristic and has a quick responsiveness.

(Modification of Armature Assembly)

Figure 10:
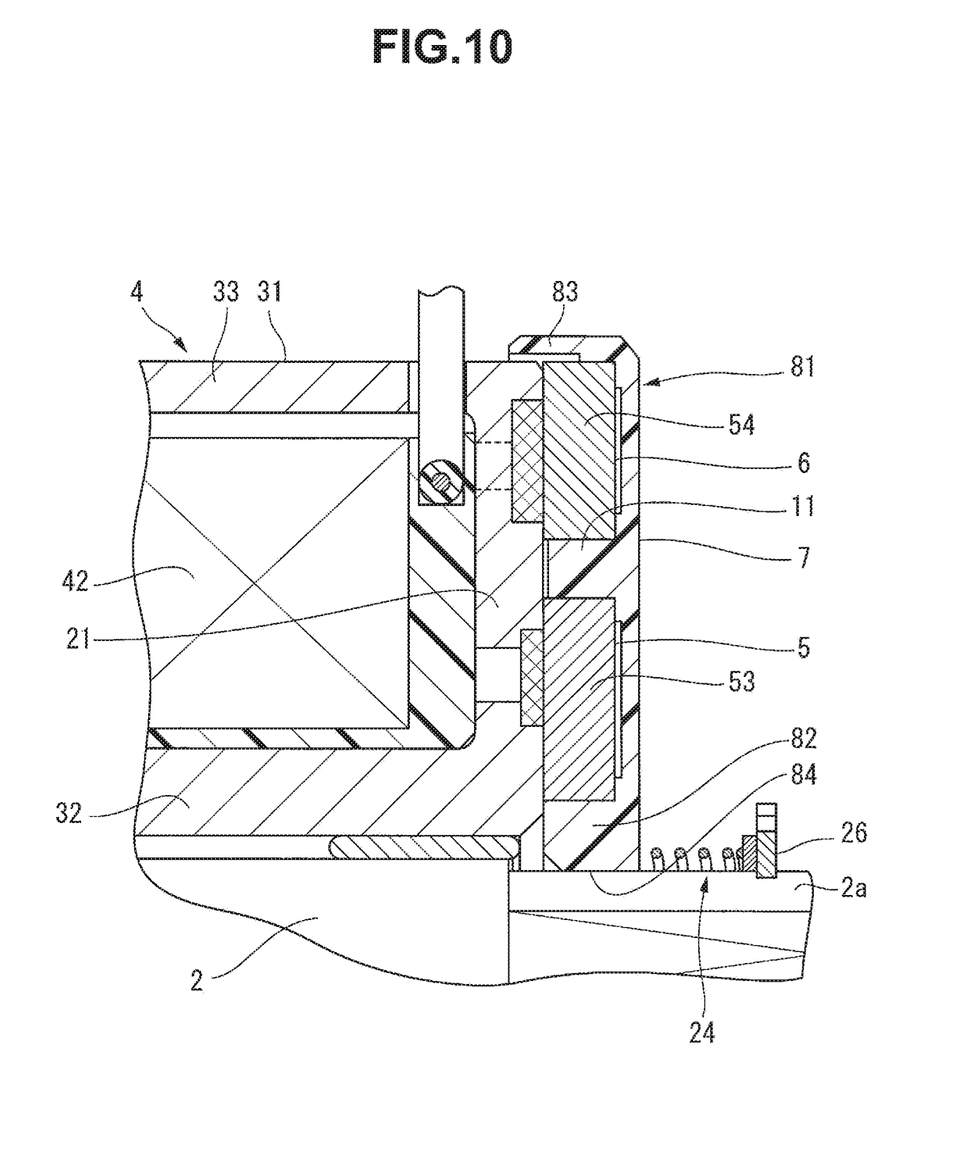
FIG. 10 is a sectional view showing a modification of the armature assembly.

The armature assembly can be configured as shown in FIG. 10. In FIG. 10, members that are the same as or similar to those described with reference to FIGS. 1 to 9 are denoted by the same reference numerals, and a detailed description thereof will appropriately be omitted.

The coupling 7 of an armature assembly 81 shown in FIG. 10 includes a boss portion 82 through which the braking shaft 2 extends, and also includes a cover portion 83 that covers the front end of the field core 31. The boss portion 82 is formed into a cylindrical shape including a shaft hole 84 in which the connecting portion 2a of the braking shaft 2 is fitted, and is supported by the connecting portion 2a of the braking shaft 2 to be movable in the axial direction. The rear end of the boss portion 82 is in contact with the disc portion 21 of the field core 31. The inner peripheral portion of the inner armature 5 is fitted on the boss portion 82.

The cover portion 83 is formed into a cylindrical shape, and projects backward on the outer side in the radial direction with respect to the outer armature 6. The projecting-side end of the cover portion 83 overlaps the front end of the field core 31 in the axial direction of the braking shaft 2. That is, the coupling 7 extends from the outer peripheral portion of the coupling 7 to the field core 31, and covers a part of the outer peripheral surface of the field core 31 (the outer peripheral surface of the front end of the field core 31). When the cover portion 83 is provided in this way, an abrasion powder generated in the friction engaging portion between the field core 31 and the armature assembly 81 can be prevented from scattering, and an external foreign substance can be prevented from entering the friction engaging portion.

In the above-described embodiment, an example in which the disc portion 21 of the field core 31 includes the two magnetic shielding portions 47 and 48 has been described. However, the disc portion 21 may include three or more magnetic shielding portions. In addition, the outer slits 55 of the outer magnetic shielding portion 47 and the inner slits 57 of the inner magnetic shielding portion 48 each have an arcuated long circle shape. However, the shape may be, for example, an arcuated rectangular shape.

In the above-described embodiment, the inner magnetic shielding portion 48 includes the plurality of inner slits 57 and the inner bridge portions 58. To make the magnetic shielding rate of the inner magnetic shielding portion 48 higher, an annular hole can be formed in the inner groove 52 in place of the inner slits 57, although not illustrated. In this case, it is preferable to fill the annular hole with a magnetic shielding member made of a non-magnetic material and integrally connect, via the magnetic shielding member, the inner peripheral side and the outer peripheral side of the disc portion 21 separated by the annular hole.

What is claimed is:

1. An excitation operation brake comprising:
a braking shaft;
an armature attached to the braking shaft such that the armature rotates integrally with the braking shaft;
a field core including a disc facing the armature in an axial direction of the braking shaft, and an annular groove; and
an exciting coil stored in the annular groove of the field core,
wherein the disc forms a magnetic flux path that makes a magnetic flux generated by energizing the exciting coil flow in a radial direction of the disc,
the disc includes a plurality of magnetic shielding portions that make the magnetic flux bypass to the armature a plurality of times,
of the plurality of magnetic shielding portions, an outer magnetic shielding portion located on an outer side in the radial direction includes a low-magnetic resistance path having a magnetic resistance smaller than a magnetic resistance of a magnetic path that bypasses to the armature,
the outer magnetic shielding portion includes a plurality of outer slits formed at a first interval in a circumferential direction of the disc, and outer bridge portions that are regions between the outer slits adjacent in the circumferential direction,
the outer slits have a width smaller than a width of the outer bridge portions in the circumferential direction, and
the outer bridge portions for the low-magnetic resistance path.

2. The brake according to claim 1, wherein
the plurality of magnetic shielding portions further include an inner magnetic shielding portion located on an inner side in the radial direction with respect to the outer magnetic shielding portion,
the inner magnetic shielding portion includes a plurality of inner slits formed at a second interval in the circumferential direction, and inner bridge portions that are regions between the inner slits adjacent in the circumferential direction, and
the inner slits have a width larger than a width of the inner bridge portions in the circumferential direction.

3. The brake according to claim 2, wherein
an angle from one end to the other end of the outer slit in the circumferential direction is smaller than an angle from one end to the other end of the inner slit in the circumferential direction.

4. The brake according to claim 2, wherein
the armature includes an outer armature facing the outer magnetic shielding portion, and an inner armature facing the inner magnetic shielding portion,
the outer armature and the inner armature are supported by a disc-shaped support member that rotates integrally with the braking shaft,
the outer armature, the inner armature, and the support member form an armature assembly, and
the armature assembly is biased toward the disc by a spring member.

5. The brake according to claim 2, wherein
the inner slits and the outer slits each have an arcuated long circle shape centered at an axis of the breaking shaft.

6. The brake according to claim 4, wherein
the support member includes a cover that extends from an outer peripheral portion of the support member to the field core and covers a part of an outer peripheral surface of the field core.

* * * * *